United States Patent
Hilland et al.

(10) Patent No.: US 8,291,176 B2
(45) Date of Patent: Oct. 16, 2012

(54) PROTECTION DOMAIN GROUPS TO ISOLATE ACCESS TO MEMORY WINDOWS

(75) Inventors: Jeffrey Hilland, Cypress, TX (US); David J. Garcia, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1425 days.

(21) Appl. No.: 10/400,313

(22) Filed: Mar. 27, 2003

(65) Prior Publication Data

US 2004/0205379 A1   Oct. 14, 2004

(51) Int. Cl.
*G06F 12/00* (2006.01)

(52) U.S. Cl. . 711/152; 711/163; 711/173; 711/E12.046; 711/153

(58) Field of Classification Search .......... 711/147, 711/153, 163, 173, 52, E12.046, 145, 152; 715/700
See application file for complete search history.

(56) References Cited

U.S. PATENT DOCUMENTS

| | | |
|---|---|---|
| 5,325,532 A | 6/1994 | Crosswy et al. |
| 5,577,211 A * | 11/1996 | Annapareddy et al. ....... 709/232 |
| 5,675,807 A | 10/1997 | Iswandhi et al. |
| 5,737,604 A | 4/1998 | Miller et al. |
| 5,751,932 A | 5/1998 | Horst et al. |
| 5,809,285 A | 9/1998 | Hilland |
| 5,815,707 A | 9/1998 | Krause et al. |
| 5,822,571 A | 10/1998 | Goodrum et al. |
| 5,870,568 A | 2/1999 | Culley et al. |
| 5,872,941 A | 2/1999 | Goodrum et al. |
| 5,914,953 A | 6/1999 | Krause et al. |
| 5,948,111 A | 9/1999 | Taylor et al. |
| 5,964,835 A | 10/1999 | Fowler et al. |
| 5,983,269 A | 11/1999 | Mattson et al. |
| 5,987,557 A * | 11/1999 | Ebrahim ................... 710/200 |
| 6,018,620 A | 1/2000 | Culley et al. |
| 6,047,323 A | 4/2000 | Krause |
| 6,070,198 A | 5/2000 | Krause et al. |
| 6,070,253 A | 5/2000 | Tavallaei et al. |
| 6,157,967 A | 12/2000 | Horst et al. |
| 6,163,834 A | 12/2000 | Garcia et al. |
| 6,233,702 B1 | 5/2001 | Horst et al. |
| 6,484,208 B1 | 11/2002 | Hilland |
| 6,493,343 B1 | 12/2002 | Garcia et al. |
| 6,496,940 B1 | 12/2002 | Horst et al. |
| 6,502,203 B2 | 12/2002 | Barron et al. |
| 6,601,148 B2 * | 7/2003 | Beukema et al. ............ 711/153 |
| 6,604,123 B1 * | 8/2003 | Bruno et al. ................. 718/100 |
| 6,854,032 B2 * | 2/2005 | Dearth et al. ..................... 711/2 |
| 6,859,867 B1 * | 2/2005 | Berry ............................ 711/206 |
| 7,032,219 B2 * | 4/2006 | Mowers et al. .............. 717/172 |
| 7,191,469 B2 * | 3/2007 | Erlingsson ..................... 726/27 |
| 7,882,317 B2 * | 2/2011 | Hunt et al. .................... 711/163 |
| 2003/0105914 A1* | 6/2003 | Dearth et al. ..................... 711/6 |

FOREIGN PATENT DOCUMENTS

EP     0757318 A2     2/1997

* cited by examiner

*Primary Examiner* — Pierre-Michel Bataille

(57) ABSTRACT

The disclosed embodiments may relate to protection domain group, which may include a memory region associated with a process. The protection domain group may also include a plurality of memory windows associated with the memory region. Also included may be a plurality of protection domains, each of which may correspond to a memory window. The protection domains may allow access to the memory region via a corresponding memory window.

30 Claims, 4 Drawing Sheets

PROTECTION DOMAIN GROUPS TO ISOLATE ACCESS TO MEMORY WINDOWS

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the field of computer systems, it may be desirable for information to be transferred from a system memory associated with one computer system to a system memory associated with another computer system. Queue pairs ("QPs") may be used to facilitate such a transfer of data. Each QP may include a send queue ("SQ") and a receive queue ("RQ") that may be utilized in transferring data from the memory of one device to the memory of another device. The QP may be defined to expose a segment of the memory within the local system to a remote system. Memory windows ("MWs") may be used to ensure that memory exposed to remote systems may be accessed by designated QPs. Protection domains ("PDs") may be used to restrict the access to memory windows associated with a designated QP.

Protection domains may be used to ensure that designated memory segments may be accessed by an appropriately authorized QP. In a multi-client single process application a unique protection domain may be given to each client or process. Accordingly, the memory region, QP, and memory window may be assigned to the same protection domain. Thus, a memory region may be registered to each client, which may utilize large mapping infrastructure to correctly associate QPs with their respective memory areas. Performance of these large mappings may utilize resources and be expensive to maintain.

BRIEF DESCRIPTION OF THE DRAWINGS

The foregoing and other advantages of the invention may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The Remote Direct Memory Access ("RDMA") Consortium, which includes the assignee of the present invention, is developing specifications to improve the ability of computer systems to remotely access the memory of other computer systems. One such specification under development is the RDMA Consortium Protocols Verb specification, which is hereby incorporated by reference. The verbs defined by this specification may correspond to commands or actions that may form a command interface for data transfers between memories in computer systems, including the formation and management of queue pairs, memory windows, protection domains and the like.

RDMA may refer to the ability of one computer to directly place information in the memory space of another computer, while minimizing demands on the central processing unit ("CPU") and memory bus. In an RDMA system, an RDMA layer may interoperate over any physical layer in a Local Area Network ("LAN"), Server Area Network ("SAN"), Metropolitan Area Network ("MAN"), or Wide Area Network ("WAN").

Figure 1:
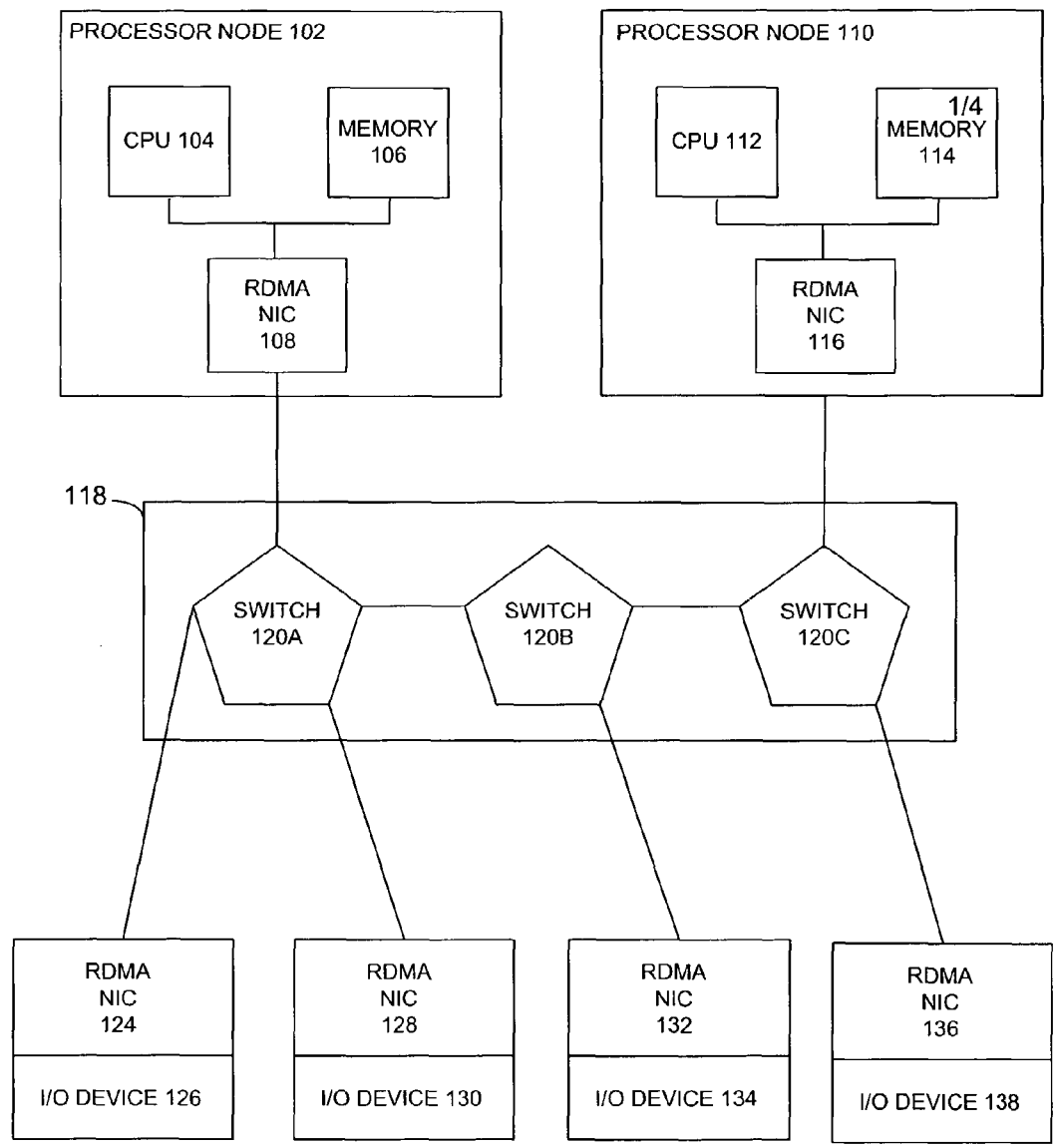
FIG. 1 is a block diagram illustrating a computer network in accordance with embodiments of the present invention.

Referring now to FIG. 1, a block diagram illustrating a computer network in accordance with embodiments of the present invention is illustrated. The computer network is indicated by the reference numeral 100 and may comprise a first processor node 102 and a second processor node 110, which may be connected to a plurality of I/O devices 126, 130, 134, and 138 via a switch network 118. Each of the I/O devices 126, 130, 134 and 138 may utilize a Remote Direct Memory Access-enabled Network Interface Card ("RNIC") to communicate with the other systems. In FIG. 1, the RNICs associated with the I/O devices 126, 130, 134 and 138 are identified by the reference numerals 124, 128, 132 and 136, respectively. The I/O devices 126, 130, 134, and 138 may access the memory space of other RDMA-enabled devices via their respective RNICs and the switch network 118.

The topology of the network 100 is for purposes of illustration only. Those of ordinary skill in the art will appreciate that the topology of the network 100 may take on a variety of forms based on a wide range of design considerations. Additionally, NICs that operate according to other protocols, such as InfiniBand, may be employed in networks that employ such protocols for data transfer.

The first processor node 102 may include a CPU 104, a memory 106, and an RNIC 108. Although only one CPU 104 is illustrated in the processor node 102, those of ordinary skill in the art will appreciate that multiple CPUs may be included therein. The CPU 104 may be connected to the memory 106 and the RNIC 108 over an internal bus or connection. The memory 106 may be utilized to store information for use by the CPU 104, the RNIC 108 or other systems or devices. The memory 106 may include various types of memory such as Static Random Access Memory ("SRAM") or Dynamic Random Access Memory ("DRAM").

The second processor node 110 may include a CPU 112, a memory 114, and an RNIC 116. Although only one CPU 112 is illustrated in the processor node 110, those of ordinary skill in the art will appreciate that multiple CPUs may be included therein. The CPU 112 may be connected to the memory 114 and the RNIC 116 over an internal bus or connection. The memory 114 may be utilized to store information for use by the CPU 112, the RNIC 116 or other systems or devices. The memory 114 may utilize various types of memory such as SRAM or DRAM.

The switch network 118 may include any combination of hubs, switches, routers and the like. In FIG. 1, the switch network 118 comprises switches 120A-120C. The switch 120A connects to the switch 120B, the RNIC 108 of the first processor node 102, the RNIC 124 of the I/O device 126 and the RNIC 128 of the I/O device 130. In addition to its connection to the switch 120A, the switch 120B connects to the switch 120C and the RNIC 132 of the I/O device 134. In addition to its connection to the switch 120B, the switch 120C connects to the RNIC 116 of the second processor node 110 and the RNIC 136 of the I/O device 138.

Each of the processor nodes 102 and 110 and the I/O devices 126, 130, 134, and 138 may be given equal priority and the same access to the memory 106 or 114. In addition, the memories may be accessible by remote devices such as the I/O devices 126, 130, 134 and 138 via the switch network 118. The first processor node 102, the second processor node 110 and the I/O devices 126, 130, 134 and 138 may exchange information using queue pairs ("QPs"). The exchange of information using QPs is explained with reference to FIG. 2.

Figure 2:
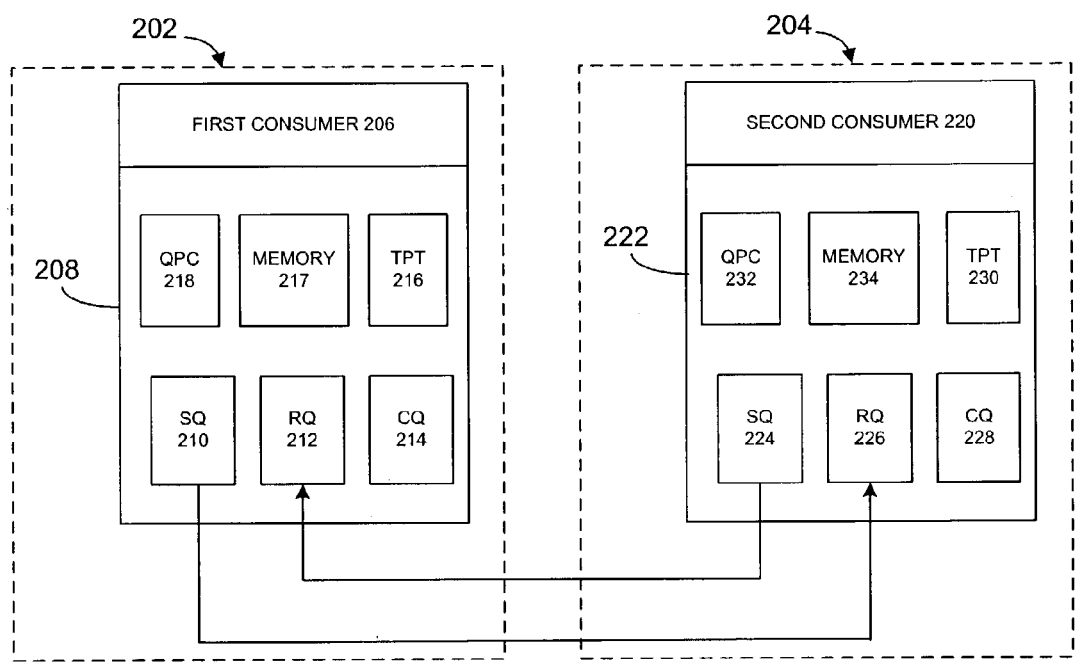
FIG. 2 is a block diagram illustrating a simplified exchange in between computers in a computer network in accordance with embodiments of the present invention.

FIG. 2 is a block diagram that illustrates the use of a queue pair to transfer data between devices in accordance with embodiments of the present invention. The figure is generally referred to by the reference numeral 200. In FIG. 2, a first node 202 and a second node 204 may exchange information using a QP. The first node 202 and second node 204 may correspond to any two of the first processor node 102, the second processor node 110 or the I/O devices 126, 130, 134 and 138 (FIG. 1). As set forth above with respect to FIG. 1, any of these devices may exchange information in an RDMA environment.

The first node 202 may include a first consumer 206, which may interact with an RNIC 208. The first consumer 206 may comprise a software process that may interact with various components of the RNIC 208. The RNIC 208, may correspond to one of the RNICs 108, 116, 126, 130, 134 or 138 (FIG. 1), depending on which of devices associated with those RNICs is participating in the data transfer. The RNIC 208 may comprise a send queue 210, a receive queue 212, a completion queue ("CQ") 214, a memory translation and protection table ("TPT") 216, a memory 217 and a QP context 218.

The second node 204 may include a second consumer 220, which may interact with an RNIC 222. The second consumer 220 may comprise a software process that may interact with various components of the RNIC 222. The RNIC 222, may correspond to one of the RNICs 108, 116, 126, 130, 134 or 138 (FIG. 1), depending on which of devices associated with those RNICs is participating in the data transfer. The RNIC 222 may comprise a send queue 224, a receive queue 226, a completion queue 228, a TPT 230, a memory 234 and a QP context 232.

The memories 217 and 234 may be registered to different processes, each of which may correspond to the consumers 206 and 220. The queues 210, 212, 214, 224, 226, or 228 may be used to transmit and receive various verbs or commands, such as control operations or transfer operations. The completion queue 214 or 228 may store information regarding the sending status of items on the send queue 210 or 224 and receiving status of items on the receive queue 212 or 226. The TPT 216 or 230 may comprise a simple table or an array of page specifiers that may include a variety of configuration information in relation to the memories 217 or 234.

The QP associated with the RNIC 208 may comprise the send queue 210 and the receive queue 212. The QP associated with the RNIC 222 may comprise the send queue 224 and the receive queue 226. The arrows between the send queue 210 and the receive queue 226 and between the send queue 224 and the receive queue 212 indicate the flow of data or information therebetween. Before communication between the RNICs 208 and 222 (and their associated QPs) may occur, the QPs may be established and configured by an exchange of commands or verbs between the RNIC 208 and the RNIC 222. The creation of the QP may be initiated by the first consumer 206 or the second consumer 220, depending on which consumer desires to transfer data to or retrieve data from the other consumer.

Information relating to the configuration of the QPs may be stored in the QP context 218 of the RNIC 208 and the QP context 232 of the RNIC 222. For instance, the QP context 218 or 232 may include information relating to a protection domain ("PD"), access rights, send queue information, receive queue information, completion queue information, or information about a local port connected to the QP and/or remote port connected to the QP. However, it should be appreciated that the RNIC 208 or 222 may include multiple QPs that support different consumers with the QPs being associated with one of a number of CQs.

To prevent interferences in the memories 217 or 234, the memories 217 or 234 may be divided into memory regions ("MRs"), which may contain memory windows ("MWs"). An entry in the TPT 216 or 230 may describe the memory regions and may include a virtual to physical mapping of a portion of the address space allocated to a process. These memory regions may be registered with the associated RNIC and the operating system. The nodes 202 and 204 may send a unique steering tag ("STag") to identify the memory to be accessed, which may correspond to the memory region or memory window.

Also, the node 202 or 204 may have a unique QP identity for communications with the other node 202 or 204. By using the STag and QP, the access to the memory region by the node 202 or 204 over the designated QP may be restricted to STags that have the same PD. Memory windows may also be defined in the memories 217 and 234 to allow flexible and efficient access control to the memory regions. With a memory window, a process may use a send queue to bind a pre-allocated window or segment of memory to a specified portion of the memory region. Thus, the memory region and memory window may be utilized to restrict the memory that the various QPs may access within the memory 217 or 234. In this manner, QPs may avoid interference with one another. The interaction between QPs, PDs, MRs, and MWs in the context of data transfers employing multiple QPs is explained with reference to FIG. 3.

Figure 3:
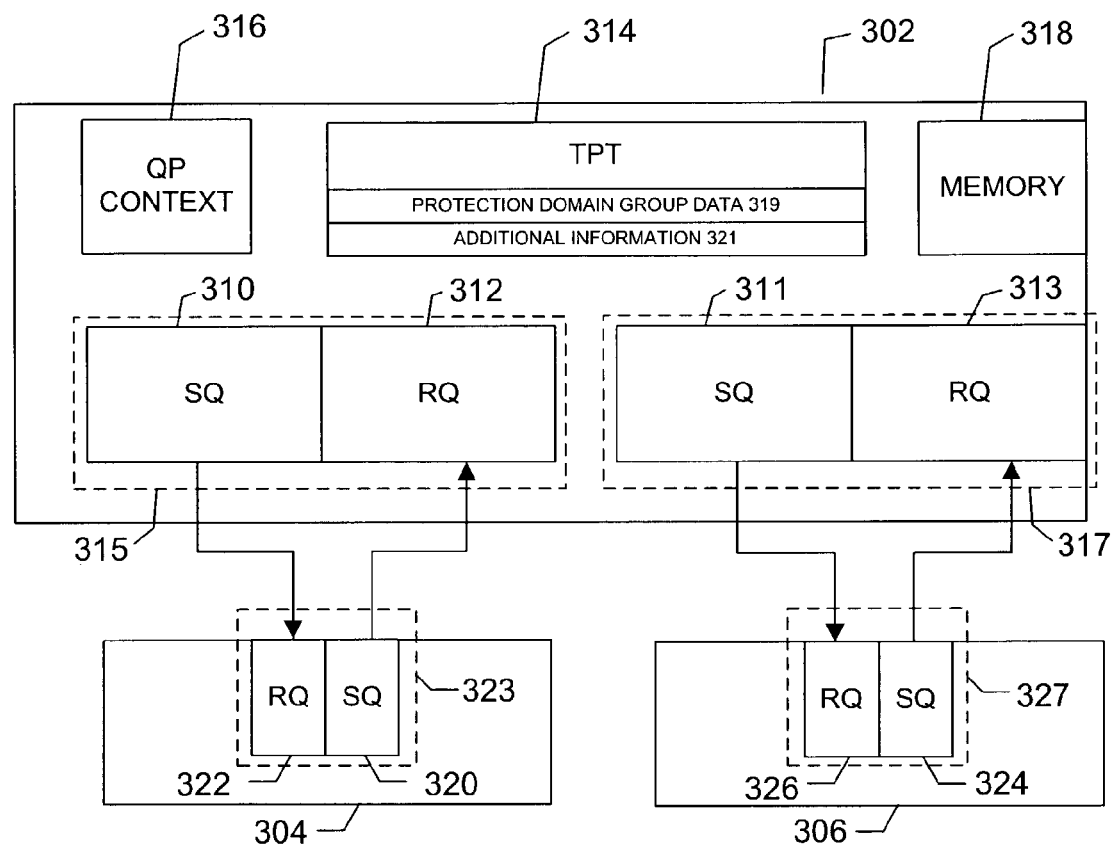
FIG. 3 is a block diagram illustrating a simplified memory allocation and communication for a computer network in accordance with embodiments of the present invention.

FIG. 3 is a block diagram illustrating data exchange using multiple queue pairs in accordance with embodiments of the present invention. The diagram is generally referred to by the reference numeral 300. A process or application may be operating on a server node 302, which may correspond to one of the nodes 202 or 204 (FIG. 3). The server node 302 may include a first send queue 310, a second send queue 311, a first receive queue 312 and a second receive queue 313, which may be similar to the queues 212 and 214 of FIG. 2. The use of two sets of send queues and receive queues indicates that two sets of QPs have been established for communication between the server node 302 and other devices. The send queue 310 and the receive queue 312 together form a QP that is identified by the reference numeral 315. The send queue 311 and the receive queue 313 together form a QP that is identified by the reference numeral 317.

The QP 315 may be adapted to exchange information with a corresponding QP 323, which may comprise a send queue 320 and a receive queue 322. The QP 323 may be located in a node 304, which may correspond to a device with which the server node 302 is exchanging information. The arrows between the send queue 310 and the receive queue 322 and between the send queue 320 and the receive queue 312 indicate the flow of information therebetween. Similarly, the QP 317 may be adapted to exchange information with a corresponding QP 327, which may comprise a send queue 324 and a receive queue 326. The QP 327 may be located in a node 306, which may correspond to a device with which the server node 302 is exchanging information. The arrows between the send queue 311 and the receive queue 326 and between the send queue 324 and the receive queue 313 indicate the flow of information therebetween.

The QPs 315 and 317 may be associated with a TPT 314, which may correspond to the TPTs 216 or 230 of FIG. 2. A QP context 316 may correspond to the QP context 218 or 232 of FIG. 2. The TPT 314 may also include protection domain group data 319, which may comprise one or more fields containing configuration information about protection domain groups. Protection domains groups may be a collection of protection domains that are grouped together and correspond with a specific process or consumer. The protection domain group data 319 may comprise protection domain masks, which are described in greater detail below. The TPT 314 may also comprise additional information 321, which may correspond to access controls, key instances, physical address table sizes, page sizes, virtual addresses, first page offsets, lengths, STags, physical address table pointers and the like.

A protection domain group may be formed by collecting various protection domains into a group that corresponds to the protection domain group data field 319. The grouping of the protection domains may be implemented by creating a protection domain mask, a link list, or other similar approach. For instance, with a protection domain mask, the protection domain information associated with a QP attempting to access the memory 318 may be compared to the protection domain mask in the protection domain group information field 319 to determine if the access is authorized. This mask may be formed at the beginning of the memory registration, at initialization, or other suitable time. A protection domain group may be formed by a verb, such as an "allocate protection domain group" verb. This verb may form a mask of low or high order bits that may be utilized in the memory region context. The mask may be used to mask off or ignore certain bits of the protection domain of the QP, memory widow and memory region before comparing or validating them. A protection domain group may be removed or closed with a separate verb, such as a "destroy protection domain" verb. The "destroy protection domain verb" may be used to remove or reset the protection domain group mask.

The protection domain group data field 319 may be utilized to provide a process with a memory region that is shared among multiple clients and/or processes. When a consumer or process requests a protection domain, a protection domain group may be established for that process. The protection domain group may be referred to as PDG1. The identity of PDG1 may be determined from information provided by the process to be utilized, information within the request, or the like. Also, a memory region, which may be referred to as MR1, may be registered for the protection domain group PDG1. The protection domain group PDG1 may have access to the memory 318 within this memory region MR1. A memory window, which may be referred to as MWA or MWB, may be bound to an individual protection domain, which may be referred to as PDA or PDB. The protection domains PDA and PDB, which may both be a part of PDG1, may both be located within the memory region MR1. Also, PDA and PDB may both belong to PDG1 even though PDA and PDB are associated with different clients.

After the registration of PDG1, MR1, MWA, MWB, PDA and PDB, a remote memory access of the memory 318 by a QP (for example, the QP 322 or QP 326) may begin with the validation of access rights. To verify whether access to the memory 318 will be permitted, the memory window protection domain may be checked with the protection domain of the QP that is seeking access to MR1. For instance, the protection domain of the memory window MWA may be checked against the protection domain of the QP within the QP context to ensure that they match. Also, the protection domain of the memory window MWA or MWB and the protection domain of the QP may be validated against the protection domain group PDG1 of the memory region MR1. In verifying these elements, the protection domain group PDG1 may be checked to see if it includes the protection domain of the associated QP and memory window (MWA or MWB). If the protection domains of the QP and memory window are within PDG1, then access to the memory region MR1 may be granted. The use of protection domain groups may provide better isolation between clients or processes seeking to access memory. This isolation may help to maintain protection semantics and conserve the use of computing resources.

Figure 4:
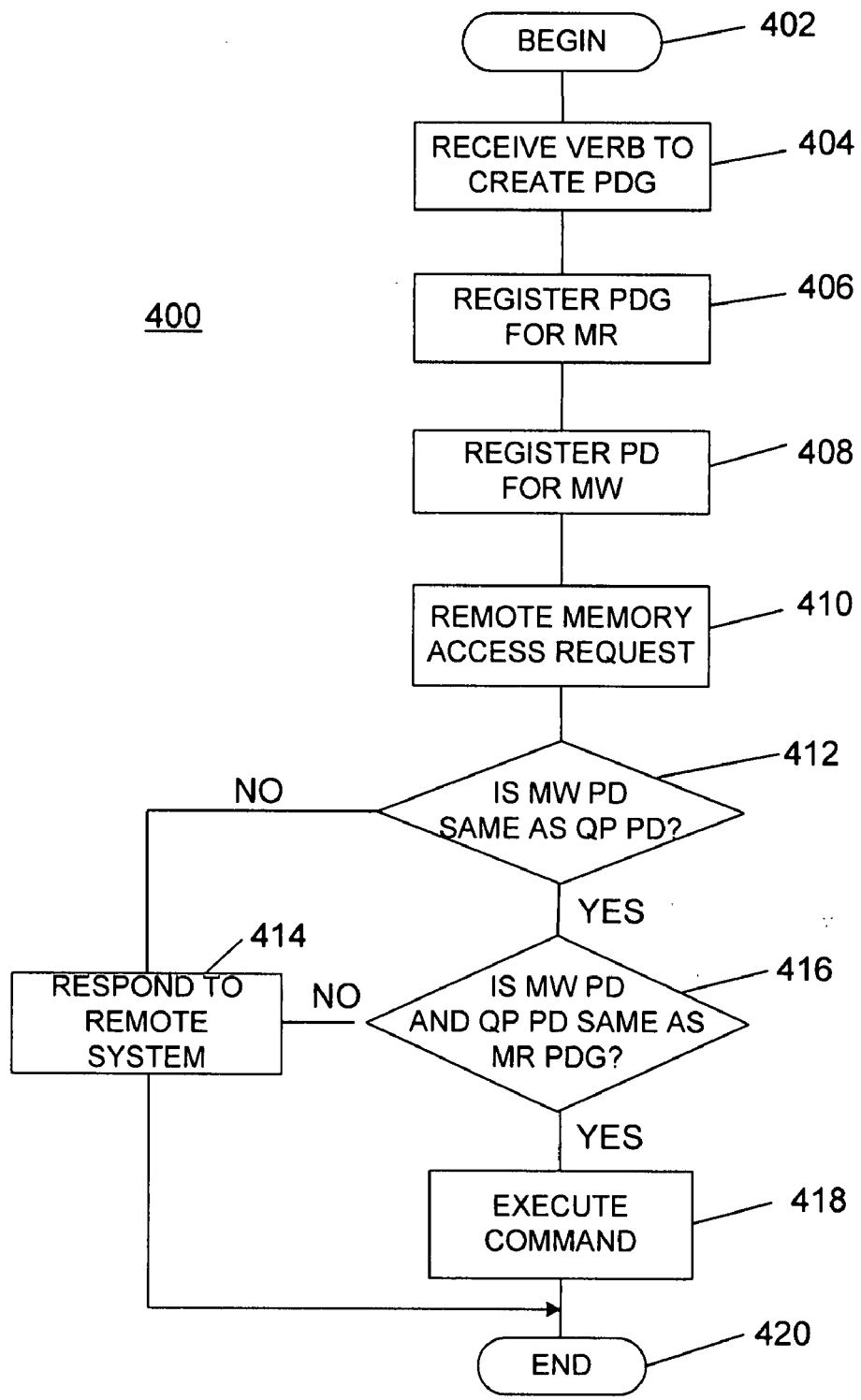
FIG. 4 is illustrates a flow chart of computer network in accordance with embodiments of the present invention.

Turning to FIG. 4, a flow diagram is illustrated in accordance with embodiments of the present invention. In the diagram, generally referred to by reference numeral 400, protection domain groups may be implemented and may be utilized in a system, such as a computer system. The process begins at block 402. At block 404, a protection domain group is formed. A verb or command, such as an "allocate protection domain group" verb or command, may be used to form a protection domain group of a specified size and define the specific protection domains to be included in the protection domain group. A memory region may be registered for a given protection domain group, as shown at block 406. The memory region may be determined on a process basis or on a type of client basis. For instance, each process that may be operating on an operating system may have a protection domain group associated with that unique process.

As set forth above, the registration process for the protection domain group may include the formation of a mask of bits that may be used to compare protection domains associated with data requests to the group of authorized protection domains that are members of a protection domain group. For instance, a protection domain group mask of 0x000F h may be used to specify a protection domain group having 16 protection domains numbered 00-0F h. The mask or other descriptive information regarding a protection domain group may be stored in the protection domain group data field 319 (FIG. 3) of the TPT 314 (FIG. 3). Following the registration of the memory region, a memory window may be registered, as shown at block 408. The memory window may be registered based on a process or on information provided from a verb or command. Further, the memory window may be bound against a designated protection domain, which may be within the protection domain group.

When a remote memory access begins (block 410), the access rights for the memory access may be validated through various processes. At block 412, the system may verify the information in the packet to determine if the protection domain of the memory window ("MW PD") is the same as the protection domain of the QP ("QP PD"). The MWPD may be located within a list, a table, or memory, such as the TPT 314 of FIG. 3. The QP PD may be within the request from the remote system or located within the system in the QP context 316 of FIG. 3.

If the MW PD is not the same as the QP PD, then the system may abort the requested operation and respond to the remote system as shown at block 414. For instance, the system may send an "abort" message or simply terminate the connection to the remote system. However, if MW PD and the QP PD are the same, then the system may verify the MW PD and the QP PD against the group protection domain of the memory region ("MR PDG"), as shown at block 416. This comparison may be done with the bit mask formed when the protection domain group was created. The MR PDG may include any number of protection domains that are verified by using the designated mask. If the MW PD and QP PD are not the same as MR PDG, then the system may abort the requested operation and respond to the remote system, as shown at block 414. For instance, the system may send an "abort" message or simply terminate the connection to the remote system. However, if MW PD, the QP PD and the MR PDG match, then the system may execute the requested operation, as shown at block 418. The process ends at block 420.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A protection domain group, comprising:
a memory region associated with a process;
a plurality of memory windows associated with the memory region;
a plurality of protection domains, each of the protection domains corresponding to one of the plurality of memory windows, each of the plurality of protection domains being adapted to allow access to the memory region only via the corresponding one of the plurality of memory windows to provide isolation between clients or processes seeking to access each one of the plurality of memory windows; and
an identifier assigned to the protection domain group and used to verify access to each one of the plurality protection domains within the protection domain group.

2. The protection domain group set forth in claim 1, wherein a queue pair is associated with each of the plurality of protection domains.

3. The protection domain group set forth in claim 1 wherein attributes of the protection domain group are defined in a translation and protection table ("TPT").

4. The protection domain group set forth in claim 3, wherein the identifier is a mask stored to the translation and protection table (TPT).

5. The protection domain group set forth in claim 1, wherein the identifier is a mask.

6. The protection domain group set forth in claim 1, wherein the identifier is a link list.

7. The protection domain group set forth in claim 1 wherein access to the memory region is permitted if a requesting device corresponding to one of the plurality of protection domains issues a request to access the memory region.

8. The protection domain group set forth in claim 1 wherein access to the memory region is permitted if a requesting queue pair corresponding to one of the plurality of protection domains issues a request to access the memory region.

9. The protection domain group of claim 1, wherein access to a particular memory window of the plurality of memory windows is authorized based, at least in part, on comparing protection domain information associated with a queue pair attempting to access the particular memory window with the identifier that is assigned to the protection domain group associated with the particular memory window.

10. A computer system, comprising:
a processor;
a storage device that is adapted to store data for use by the processor;
a user input device that is adapted to receive input from a user; and
a system memory that is adapted to store data retrieved from the storage device for access by the processor, the system memory being organized into a protection domain group, the protection domain group comprising:
a memory region associated with a process;
a plurality of memory windows associated with the memory region;
a plurality of protection domains, each of the protection domains corresponding to one of the plurality of memory windows, each of the plurality of protection domains being adapted to allow access to the memory region only via the corresponding one of the plurality of memory windows to provide isolation between clients or processes seeking to access each one of the plurality of memory windows; and
an identifier assigned to the protection domain group and used to verify access to each one of the plurality protection domains within the protection domain group.

11. The computer system set forth in claim 10, wherein a queue pair is associated with each of the plurality of protection domains.

12. The computer system set forth in claim 10, wherein attributes of the protection domain group are defined in a translation and protection table ("TPT").

13. The computer system set forth in claim 12, wherein the identifier is a mask stored to the translation and protection table ("TPT").

14. The computer system set forth in claim 10, wherein the identifier is a mask.

15. The protection domain group set forth in claim 10, wherein a link list defines the plurality of protection domains.

16. The computer system set forth in claim 10, wherein access to the memory region is permitted if a requesting device corresponding to one of the plurality of protection domains issues a request to access the memory region.

17. The computer system set forth in claim 10, wherein access to the memory region is permitted if a requesting queue pair corresponding to one of the plurality of protection domains issues a request to access the memory region.

18. The computer system of claim 10, wherein access to a particular memory window of the plurality of memory windows is authorized based, at least in part, on comparing protection domain information associated with a queue pair attempting to access the particular memory window with the identifier that is assigned to the protection domain group associated with the particular memory window.

19. A method comprising:
defining a memory region, the memory region being associated with a process;
defining a plurality of memory windows associated with the memory region;

creating a plurality of protection domains corresponding to a protection domain group, each of the protection domains corresponding to one of the plurality of memory windows, each of the plurality of protection domains being adapted to allow access to the memory region only via the corresponding one of the plurality of memory windows to provide isolation between clients or processes seeking to access each one of the plurality of memory windows; and assigning an identifier to the protection domain group, the identifier used to verify access to each one of the plurality protection domains within the protection domain group.

20. The method set forth in claim 19, comprising associating a queue pair with each of the plurality of protection domains.

21. The method set forth in claim 19, comprising defining attributes of the protection domain group in a translation and protection table ("TPT").

22. The method set forth in claim 21, wherein assigning an identifier to the protection domain group comprises defining a mask that corresponds to the plurality of protection domains in the translation and protection table ("TPT").

23. The method set forth in claim 19, wherein assigning an identifier to the protection domain group comprises defining a mask that corresponds to the plurality of protection domains.

24. The method set forth in claim 19, comprising defining a link list that corresponds to the plurality of protection domains.

25. The method set forth in claim 19, comprising allowing access to the memory region if a requesting device corresponding to one of the plurality of protection domains issues a request to access the memory region.

26. The method set forth in claim 19, comprising allowing access to the memory region if a requesting queue pair corresponding to one of the plurality of protection domains issues a request to access the memory region.

27. A method of managing a memory access in a computer system, the computer system having a protection domain group comprising a plurality of protection domains, each of the protection domains corresponding to one of a plurality of memory windows to provide isolation between clients or processes seeking to access the memory windows, the method comprising the acts of:

receiving a request for memory access from a queue pair, the queue pair having a queue pair context that includes data that specifies an associated protection domain;

comparing the data that specifies an associated protection domain to an identifier that is assigned to the protection domain group to determine if the associated protection domain is one of the plurality of protection domains in the protection domain group, wherein the identifier used to verify access to each one of the plurality protection domains within the protection domain group; and performing the request for memory access if the associated protection domain is one of the plurality of protection domains in the protection domain group.

28. The method set forth in claim 27, wherein comparing the data that specifies an associated protection domain to an identifier that is assigned to the protection domain group comprises comparing a mask that specifies the protection domain group to the identifier to determine if the associated protection domain is one of the plurality of protection domains in the protection domain group.

29. The method set forth in claim 27, comprising terminating a connection if the associated protection domain is not one of the plurality of protection domains in the protection domain group.

30. The method of claim 19, comprising allowing access to a particular memory window of the plurality of memory windows based, at least in part, on comparing protection domain information associated with a queue pair attempting to access the particular memory window with the identifier that is assigned to the protection domain group associated with the particular memory window.

* * * * *